(12) United States Patent
Cheslock

(10) Patent No.: US 11,002,068 B2
(45) Date of Patent: *May 11, 2021

(54) METHODS FOR MANUFACTURING CONTINUOUS SHEETS FOR ROLLER SHADES

(71) Applicant: Hunter Douglas Inc., Pearl River, NY (US)

(72) Inventor: Scott R. Cheslock, Bonduel, WI (US)

(73) Assignee: HUNTER DOUGLAS INC., Pearl River, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/599,897

(22) Filed: Oct. 11, 2019

(65) Prior Publication Data

US 2020/0040654 A1 Feb. 6, 2020

Related U.S. Application Data

(63) Continuation of application No. 15/420,279, filed on Jan. 31, 2017, now Pat. No. 10,443,303, which is a (Continued)

(51) Int. Cl.
| | |
|---|---|
| *E06B 9/264* | (2006.01) |
| *B29C 65/00* | (2006.01) |
| *B29C 65/48* | (2006.01) |
| *E06B 9/262* | (2006.01) |
| *E06B 9/266* | (2006.01) |
| *E06B 9/34* | (2006.01) |
| *B65H 45/12* | (2006.01) |
| *B65H 18/08* | (2006.01) |
| *B65H 35/04* | (2006.01) |

(Continued)

(52) U.S. Cl.
CPC .............. *E06B 9/264* (2013.01); *B29C 65/48* (2013.01); *B29C 66/1122* (2013.01); *B29C 66/435* (2013.01); *B29C 66/437* (2013.01); *B29C 66/729* (2013.01); *B29C 66/8341* (2013.01); *B65H 18/08* (2013.01); *B65H 35/04* (2013.01); *B65H 37/04* (2013.01); *B65H 37/06* (2013.01); *B65H 45/12* (2013.01); *E06B 9/262* (2013.01); *E06B 9/266* (2013.01); *E06B 9/34* (2013.01); *B29L 2031/719* (2013.01); *B65H 2301/4143* (2013.01); *B65H 2301/45* (2013.01); *B65H 2301/5113* (2013.01); *E06B 2009/2405* (2013.01)

(58) Field of Classification Search
CPC ........................................................ E06B 9/34
USPC .......................................................... 428/121
See application file for complete search history.

(56) References Cited

U.S. PATENT DOCUMENTS

| | | |
|---|---|---|
| 4,450,027 A | 5/1984 | Colson |
| 4,884,612 A | 12/1989 | Schnebly |

(Continued)

FOREIGN PATENT DOCUMENTS

CN 200951004 9/2007

*Primary Examiner* — Brent T O'Hern
(74) *Attorney, Agent, or Firm* — Dority & Manning, P.A.

(57) ABSTRACT

In one aspect, a method for manufacturing a continuous sheet for use within a roller shade may generally include positioning a portion of a first sheet web adjacent to a mandrel, positioning a portion of a second sheet web adjacent to the mandrel and winding the first and second sheet webs around the mandrel such that a folded segment of the first sheet web is secured to a base segment of the second sheet web.

21 Claims, 6 Drawing Sheets

Related U.S. Application Data continuation of application No. 14/566,792, filed on Dec. 11, 2014, now Pat. No. 9,567,175.

(51) Int. Cl.
  *B65H 37/04* (2006.01)
  *B65H 37/06* (2006.01)
  *B29L 31/00* (2006.01)
  *E06B 9/24* (2006.01)

(56) References Cited

U.S. PATENT DOCUMENTS

| | | | |
|---|---|---|---|
| 4,931,342 A | 6/1990 | Tolbert | |
| 5,025,334 A | 6/1991 | Perona | |
| 5,043,038 A | 8/1991 | Colson | |
| 5,158,632 A | 10/1992 | Colson | |
| 5,455,098 A | 10/1995 | Cheng | |
| 5,857,511 A | 1/1999 | Judkins | |
| 6,196,291 B1 | 3/2001 | Rupel | |
| 7,588,068 B2 | 9/2009 | Colson et al. | |
| 10,443,303 B2 * | 10/2019 | Cheslock | B65H 37/04 |
| 2006/0174999 A1 | 8/2006 | Rupel | |
| 2011/0274887 A1 | 11/2011 | Fu-Lai et al. | |
| 2011/0297332 A1 | 12/2011 | Rupel | |
| 2013/0180668 A1 * | 7/2013 | Judkins | E06B 9/262 160/84.04 |
| 2013/0180669 A1 | 7/2013 | Judkins | |
| 2019/0090677 A1 | 3/2019 | Judkins | |

* cited by examiner

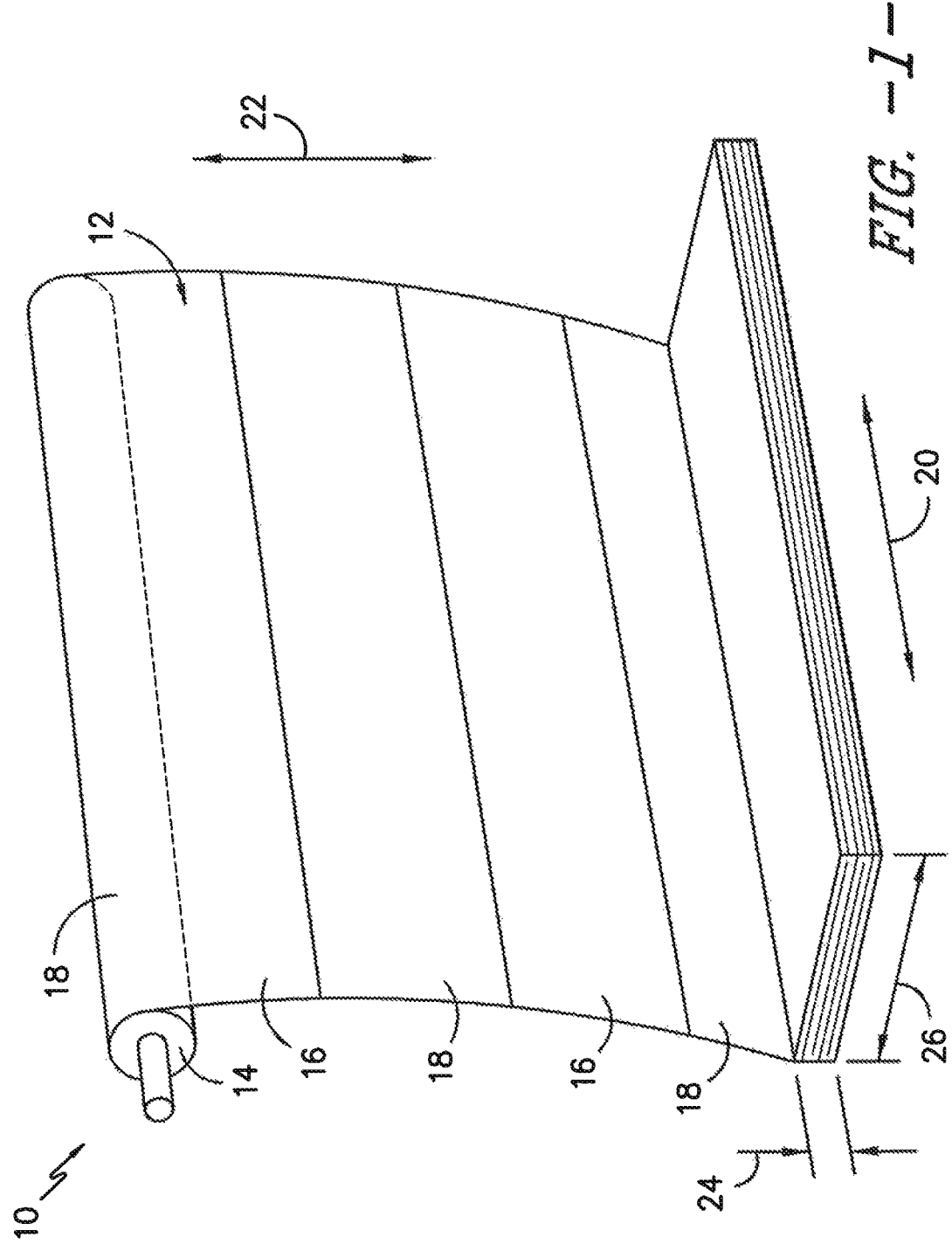

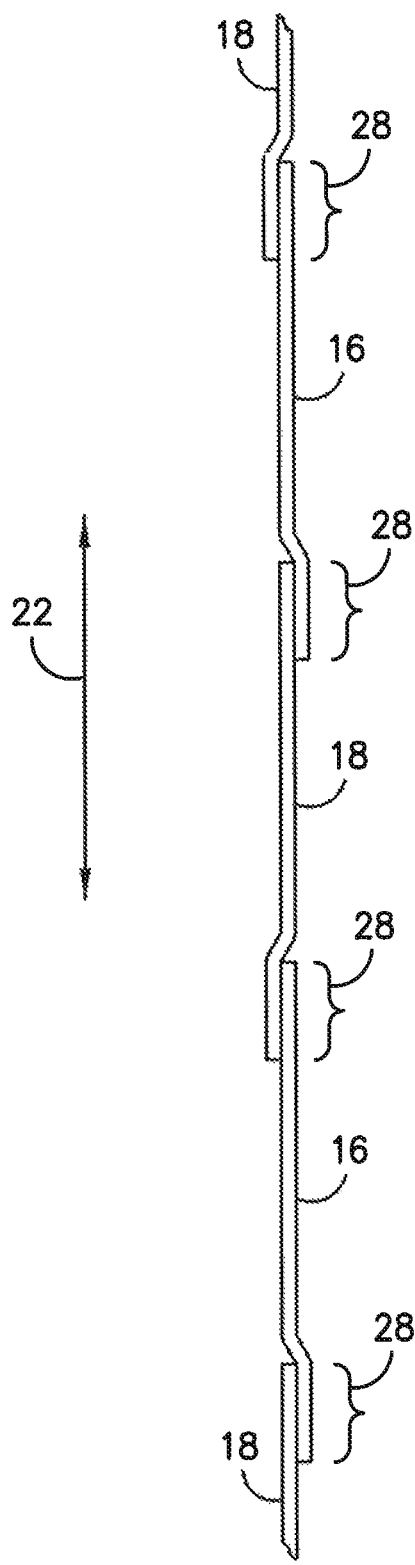
FIG. -2-

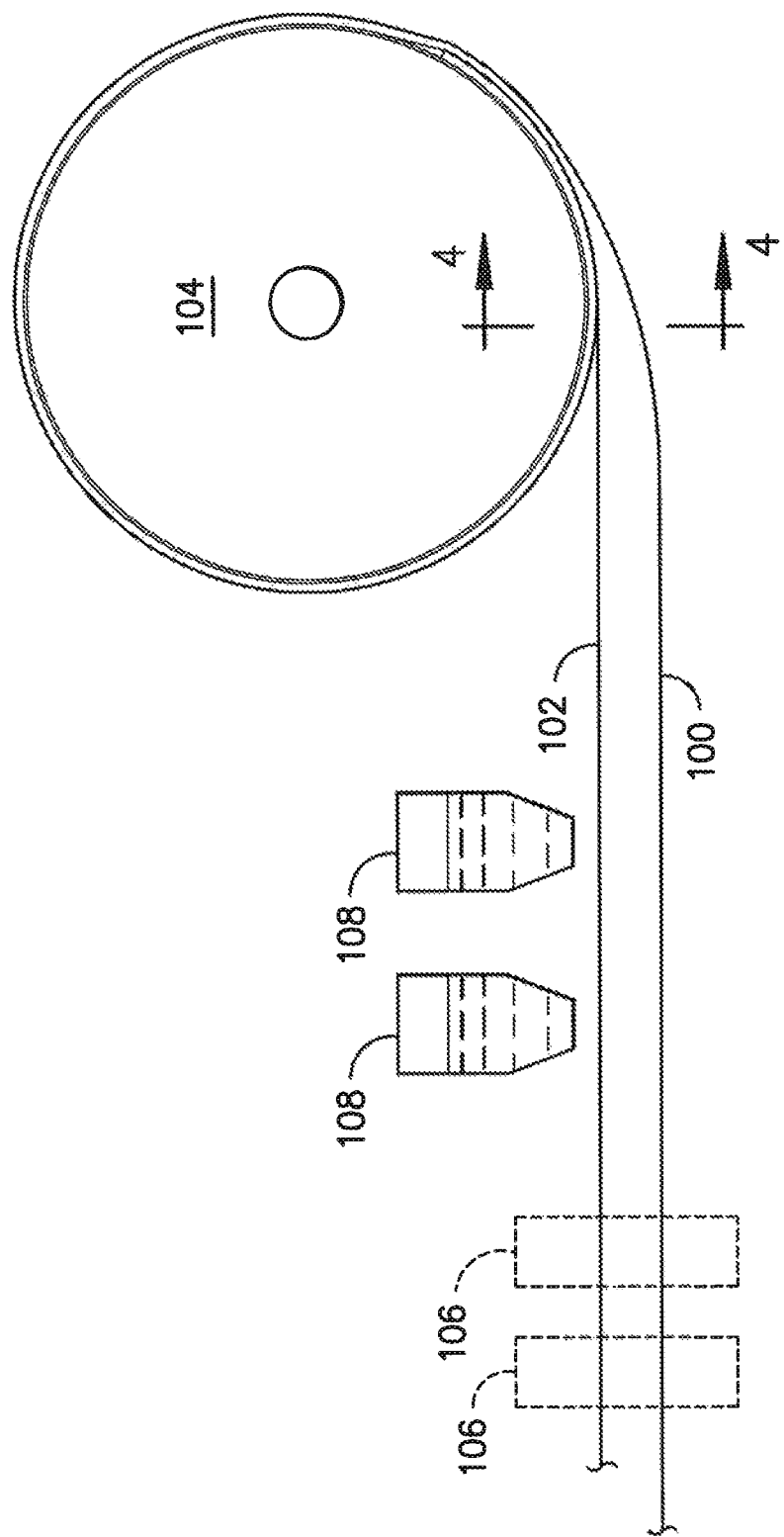
FIG. -3-

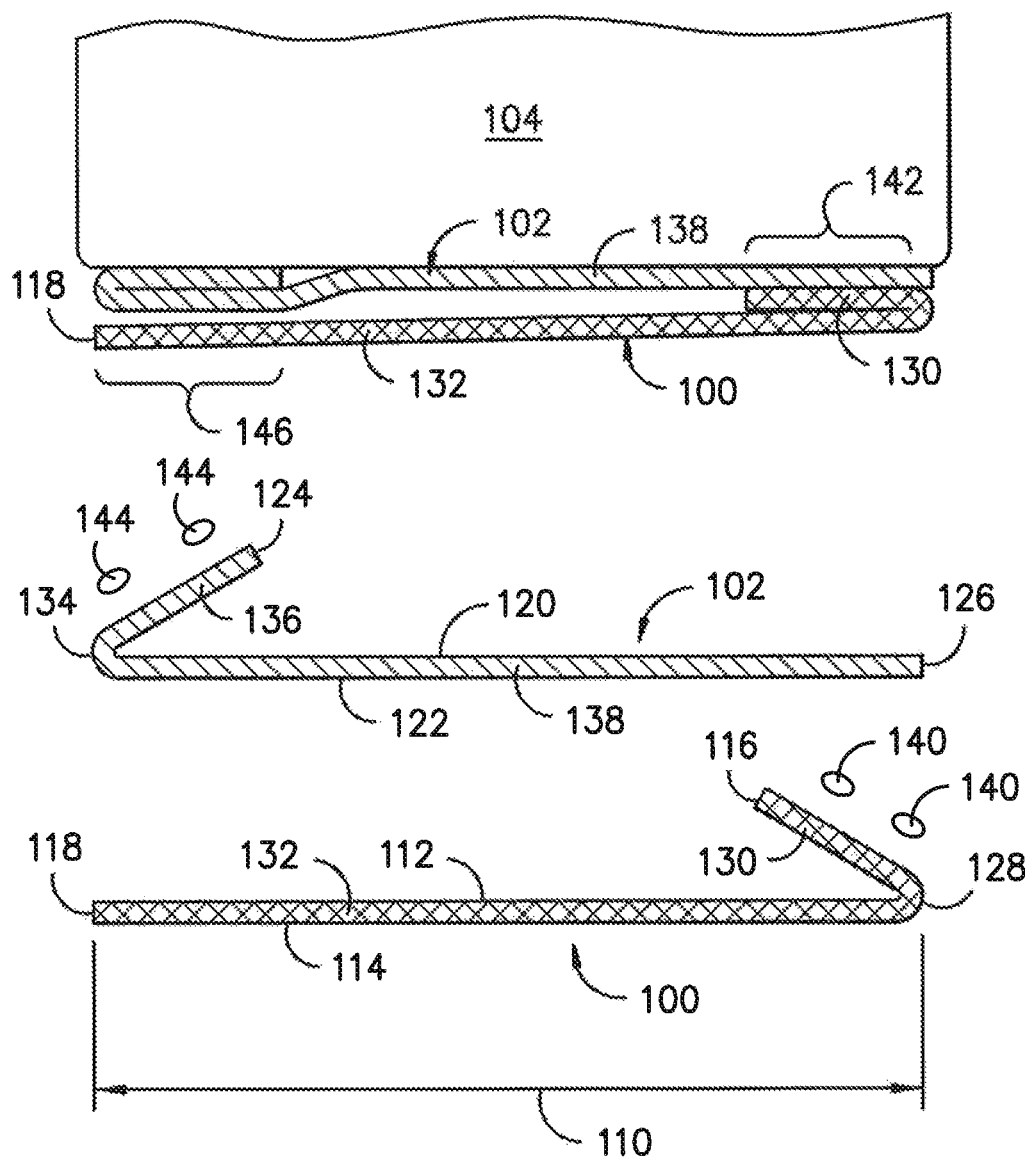
FIG. -4-

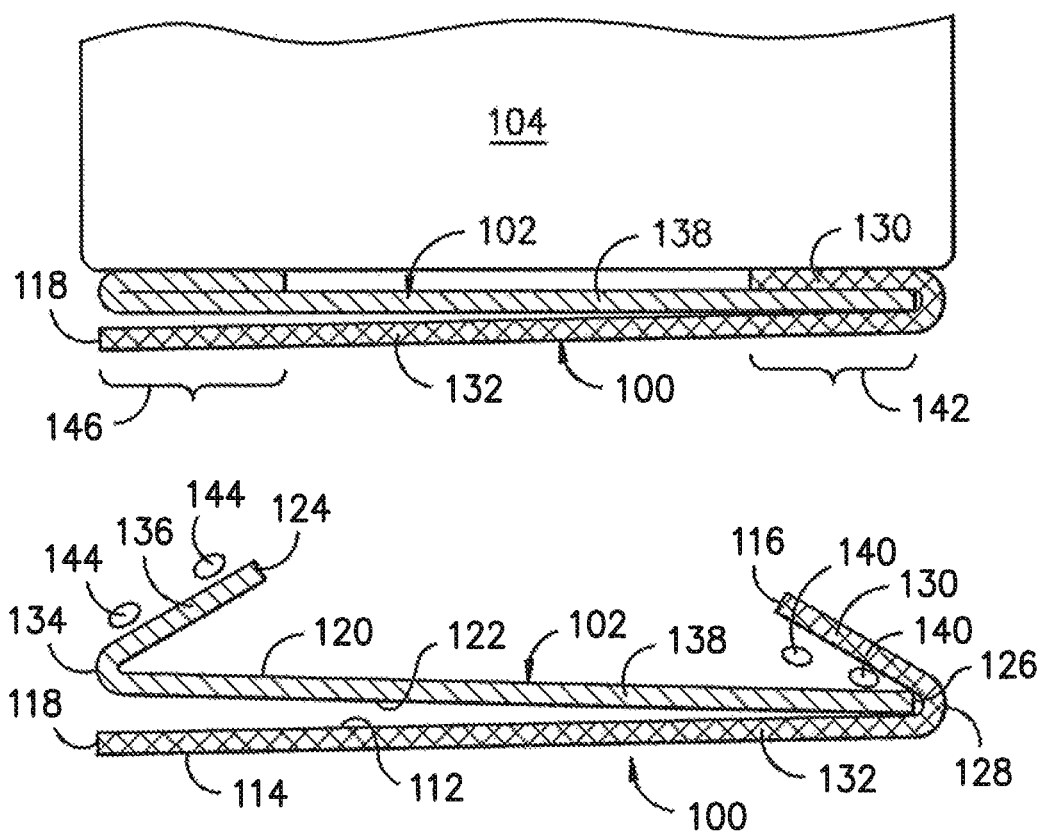
FIG. -5-

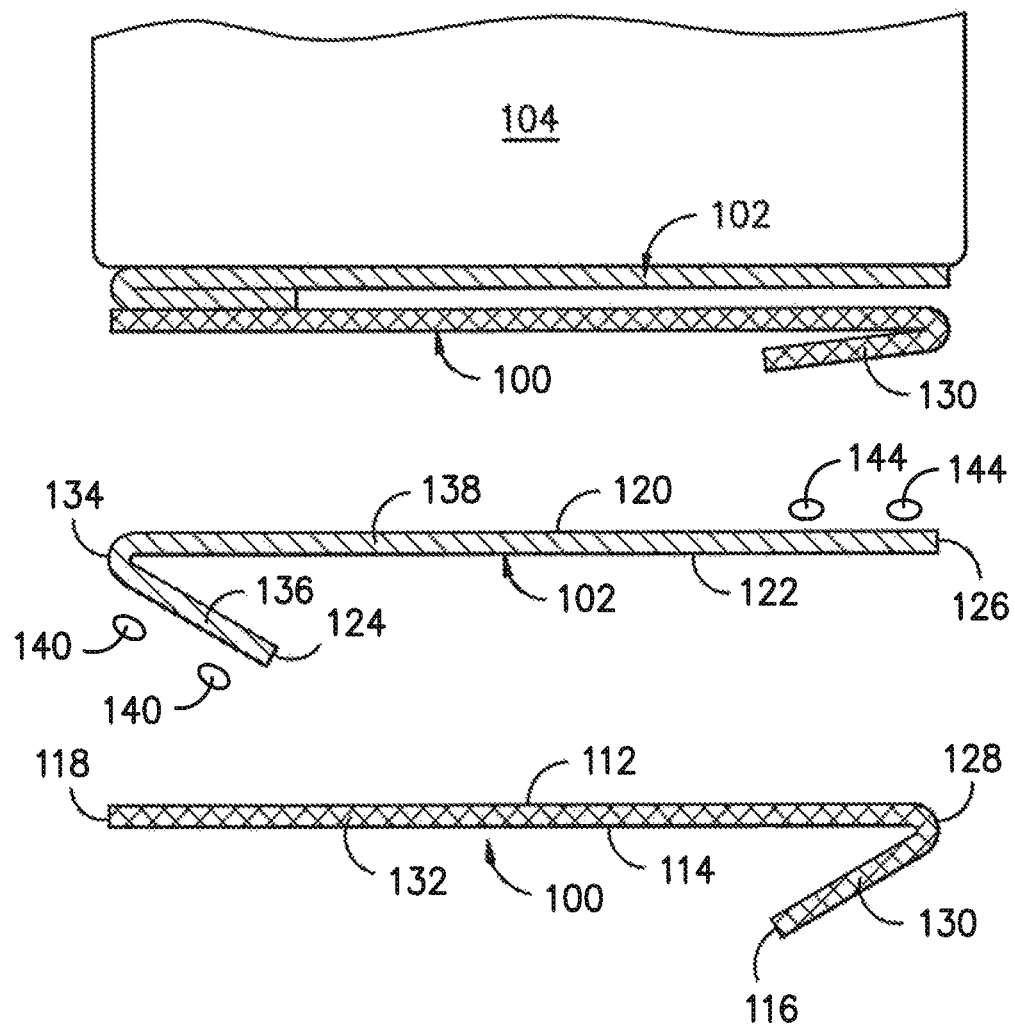
FIG. -6-

METHODS FOR MANUFACTURING CONTINUOUS SHEETS FOR ROLLER SHADES

CROSS-REFERENCE TO RELATED APPLICATIONS

This application is a continuation of and claims the benefit of priority of U.S. patent application Ser. No. 15/420,279, filed on Jan. 31, 2017, which, in turn, is a continuation of and claims the benefit of priority of U.S. patent application Ser. No. 14/566,792, filed on Dec. 11, 2014, the disclosures of both which are hereby incorporated by reference herein in their entirety for all purposes.

FIELD OF THE INVENTION

The present subject matter relates generally to roller shades and, more particularly, to methods for manufacturing flat, stackable sheets for use within roller shades.

BACKGROUND OF THE INVENTION

Various different types of coverings exist for placement in architectural openings, such as windows, doors, archways and the like. Such coverings include blinds and shades. Many shades, for instance, comprise a fabric covering that is placed in an architectural opening and includes a headrail assembly that not only mounts the shade within the opening, but also provides a control mechanism for raising and lowering the shade as desired. For instance, the control mechanism may comprise a drawstring or an electric motor.

Some shade assemblies include rollers that are rotatably mounted, usually in a horizontal orientation, across the top of the architectural opening. A shade material, such as a roller sheet, is attached to the roller. Rotating the roller in one direction causes the shade to extend in order to cover the architectural opening and rotating the roller in an opposite direction causes the shade to retract so as to reveal the architectural opening.

Shade assemblies that include a rotating roller, often referred to as roller shades, are very popular with consumers. Roller shades, for instance, are easy to operate and are very compact, especially when the shade is in a fully retracted position. However, the roller sheet used for roller shades often derives from a large roll of sheet material having a particular width. Specifically, the sheet material is unwound from the roll to a desired length and then cut to create the roller sheet. The resulting roller sheet may then be used for a roller shade designed to cover an architectural opening having a width that is the same as the width of the original roll of material or less than the width of the original roll of material (which then requires the sheet to be trimmed to the desired width). Unfortunately, width limitations for rolled sheet materials provide a design constraint for manufacturing roller shades with increased widths. Moreover, the use of standard, rolled sheet materials significantly limits the ability of the manufacturer to customize roller sheets based on desired aesthetics and/or lighting effects.

Accordingly, improved methods for manufacturing roller sheets for use within roller shades that provide the manufacturer increased options for customizing the width, aesthetics and/or lighting effects associated with a roller sheet would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for manufacturing a continuous sheet for use within a roller shade. The method may generally include positioning a portion of a first sheet web adjacent to a mandrel, wherein the first sheet web includes an upper face and a lower face extending between a folded end and a base end. The first sheet web may also define a first fold edge between its folded and base ends such that the first sheet web includes a first folded segment extending between the first fold edge and its folded end and a first base segment extending between the first fold edge and its base end. The method may also include positioning a portion of a second sheet web adjacent to the mandrel, wherein the second sheet web includes an upper face and a lower face extending between a folded end and a base end. The second sheet web may also define a second fold edge between its folded and base ends such that the second sheet web includes a second folded segment extending between the second fold edge and its folded end and a second base segment extending between the second fold edge and its base end. In addition, the method may include winding the first and second sheet webs around the mandrel such that the first folded segment of the first sheet web is secured to the second base segment of the second sheet web at a location adjacent to the base end of the second sheet web.

In another aspect, the present subject matter is directed to a method for manufacturing a continuous sheet for use within a roller shade. The method may generally include positioning a portion of a first sheet web adjacent to a mandrel, wherein the first sheet web includes an upper face and a lower face extending between a folded end and a base end. The first sheet web may also define a first fold edge between its folded and base ends such that the first sheet web includes a first folded segment extending between the first fold edge and its folded end and a first base segment extending between the first fold edge and its base end. The method may also include stacking a portion of a second sheet web on top of the first sheet web such that the second sheet web is positioned between the first sheet web and the mandrel, wherein the second sheet web includes an upper face and a lower face extending between a folded end and a base end. The second sheet web may also define a second fold edge between its folded and base ends such that the second sheet web includes a second folded segment extending between the second fold edge and its folded end and a second base segment extending between the second fold edge and its base end. In addition, the method may include securing the first folded segment of the first sheet web to the second base segment of the second sheet web at a location adjacent to the base end of the second sheet web and continuously winding the first and second sheet webs around the mandrel such that an assembly of alternating layers of portions of the first and second sheets is formed on the mandrel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a roller shade in accordance with aspects of the present subject matter;

FIG. 2 illustrates a side view of a portion of the roller shade shown in FIG. 1, particularly illustrating a portion of a roller sheet of the roller shade positioned in a vertical orientation;

FIG. 3 illustrates a simplified, schematic view of various manufacturing components that may be utilized to manufacture a roller sheet in accordance with aspects of the present subject matter, particularly illustrating a mandrel around which corresponding sheet webs are wound in order to form the roller sheet;

FIG. 4 illustrates a cross-sectional view of a portion of the mandrel and sheet webs shown in FIG. 3 taken about line 4-4, particularly illustrating one embodiment of a suitable cross-sectional configuration for the sheet webs as well as an example of the positioning of the sheet webs relative to one another as the webs are being wound around the mandrel;

FIG. 5 illustrates one embodiment of an alternative cross-sectional configuration for the sheet webs shown in FIG. 4; and FIG. 6 illustrates yet another embodiment of an alternative cross-sectional configuration for the sheet webs shown in FIG. 4.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to methods for manufacturing continuous sheets for use as roller sheets. Specifically, in several embodiments, the disclosed methods may allow for a flat, stackable roller sheet to be manufactured that has a substantially uniform profile when the sheet is placed in a vertical orientation. As will be described below, the roller sheet may be formed by winding two continuous sheet webs around a mandrel, namely a first sheet web and a second sheet web. Thus, for each complete revolution of the mandrel, two layers of sheet material may be wound around the mandrel consisting of sections of the first and second sheet webs. By continuously winding the first and second sheet webs around the mandrel, a multi-layer assembly may be formed having alternating layers of the first and second sheet webs. The multi-layer assembly may then be removed from the mandrel and cut cross-wise to create a roller sheet having alternating sheet sections formed by the alternating layers wound around the mandrel.

By forming a roller sheet using the disclosed methodology, the width of the resulting roller sheet may be directly dependent to the size of the mandrel. Specifically, for a circular mandrel, the width of the resulting roller sheet may by equal to the circumference of the mandrel. Accordingly, by carefully selecting the size of the mandrel used during the manufacturing process, roller sheets of varying widths may be created.

Additionally, due to the disclosed manufacturing process, roller sheets may be formed having alternating stripes or bands formed from different materials or having different colors/textures. For example, in several embodiments, the first sheet web may be formed from a first material and the second sheet web may be formed from a second material, thereby allowing for the creation of a roller sheet having alternating sheet sections formed from the first and second materials. Thus, by selecting materials having differing aesthetic features or light transmission properties, a roller sheet may be formed having a unique aesthetic appeal and/or a unique lighting effect.

It should be appreciated that, as used herein, the term "web" generally refers to any material suitable for use within a roller shed, including, but not limited to, woven fabrics, non-woven fabrics, knitted fabrics, films and/or laminations of any such material(s). In addition, the webs may be flexible or semi-rigid. A flexible web is formed from a material that is capable of being folded or flexed, such as woven, knitted or non-woven fabrics, vinyl or film sheets, cords of natural or synthetic fibers, monofilaments, and the like. A semi-rigid web, on the other hand, is formed from a material that is somewhat stiffer, but is still flexible or foldable to some degree.

Referring now to the drawings, FIGS. 1 and 2 illustrate one embodiment of a roller shade 10 in accordance with aspects of the present subject matter. Specifically, FIG. 1 illustrates a perspective view of the roller shade 10, particularly illustrating a roller sheet 12 of the roller shade 10 in an extended position with a portion of the sheet 12 being stacked at the bottom of the shade 10. Additionally, FIG. 2 illustrates a partial side view of the roller shade 10 shown in FIG. 1, particularly illustrating the vertically oriented portion of the roller sheet 12 shown in FIG. 1.

In general, the roller shade 10 may include a roller sheet 12 configured to be rolled or wound around a corresponding roller 14. The roller 14 may, in turn, be configured to be positioned adjacent to an architectural opening, such as a window or a door, so that the roller sheet 12 can be unwound or extended to cover the architectural opening and subsequently rewound or retracted to reveal the architectural opening. For example, in several embodiments, the roller 14 may be configured to be mounted within a headrail assembly (not shown) positioned over the architectural opening.

In several embodiments, the roller sheet 12 may include a plurality of first sheet sections 16 and a plurality of second sheet sections 18 extending in a widthwise direction (e.g., in the direction of arrow 20) along the width of the roller sheet 12. As shown in the illustrated embodiment, the first and second sheet sections 16, 18 may be attached end-to-end in an alternating fashion along a heightwise direction of the roller sheet 12 (e.g., in the direction of arrow 22) such that each first sheet section 16 is coupled vertically between an adjacent pair of second sheet sections 18, thereby forming a continuous sheet of alternating sheet sections 16, 18. As will be described in greater detail below with reference to FIGS. 3-6, such an alternating configuration may be achieved by rolling two separate, continuous sheet webs (e.g., a first sheet web 100 and a second sheet web 102) around a mandrel 104 (FIG. 3) and by securing adjacent portions of the sheet webs together as such webs overlap around the mandrel.

As particularly shown in FIG. 1, in several embodiments, the roller sheet 12 may be stackable. Specifically, in a one embodiment, the roller sheet 12 may be configured to be collapsed into a stack defining a substantially flat profile. For example, as shown in FIG. 1, the stack formed by the roller sheet 12 may generally define a substantially constant height 24 extending across a cross-wise dimension 26 of the stacked roller sheet 12. In such an embodiment, the height 24 of the stack may be "substantially constant" if the height 24 at each location along the cross-wise dimension 26 varies by less than 10%, such as less than 5% or less than 2.5% or less than 1%.

Additionally, as shown in FIG. 2, the roller sheet 12 may be configured to define a substantially straight, uniform profile when the sheet 12 is unwound and positioned in a vertical orientation. Specifically, using the manufacturing process described below with reference to FIGS. 3-6, each sheet section 16, 18 of the roller sheet 12 may be secured to adjacent sheet sections without creating tabs that extend horizontally outwardly along one or both sides of the sheet 12, thereby allowing for a more uniform vertical profile to be provided for the roller sheet 12. For example, as shown in FIG. 2, each first sheet section 16 may be coupled to the adjacent second sheet sections 18 such that the ends of the sheet sections 16, 18 overlap one another along the height of the roller sheet 12, thereby creating an overlapped portion 28 at each attachment location. As will be described below, such overlapped portions 28 may be created by securing a non-folded end of one of the sheet webs used to form the roller sheet 12 to a folded portion of the other sheet web. Thereafter, when the resulting roller sheet 12 is placed in a vertical orientation, the folds may straighten out, thereby creating the substantially uniform and straight profile shown in FIG. 2. In addition, the folds formed during the manufacturing process may also assist in allowing the roller sheet 12 to be collapsed into the flat stack described above.

It should be appreciated that, in several embodiments, the sheet webs used to form the first and second sheet sections 16, 18 of the roller sheet 12 may be made from the same material, thereby allowing for the manufacture of a continuous sheet consisting of a single material. Alternatively, the sheet webs used to form the first and second sheet sections 16, 18 may be made from two different materials, thereby allowing for the manufacture of a continuous sheet having alternating sections of differing materials. For example, the first sheet web (i.e., the web used to form the first sheet sections 16) may be formed from a first material and the second sheet web (i.e., the web used to form the second sheet sections 18) may be formed from a second material. In such an embodiment, the roller sheet 12 formed from the first and second webs may alternate along its height between the first and second materials, thereby creating a zebra or combi-type roller sheet.

In embodiments in which differing materials are used to form the roller sheet 12, the materials may be selected so as to provide any desired lighting effect or aesthetic design. For instance, the materials may be selected based on their differing light transmittance values. Thus, in one embodiment, the first sheet web may be formed from a first material having a first light transmittance value and the second sheet web may be formed from a second material having a lower or higher light transmittance value. As a result, the roller sheet 12 may be provided with alternating stripes or bands that allow differing amounts of light to pass through the sheet 12, thereby creating a unique lighting effect. It should be appreciated that the light transmittance value associated with a given web generally refers to the ratio of the amount of light (e.g., visible light having wavelengths from 380 to 780 nanometers and/or ultraviolet light having wavelengths from 300 to 380 nanometers) that is allowed to pass through the web to the amount of total light hitting or striking the web.

It should also be appreciated that, as opposed to forming the roller sheet 12 using sheet webs of differing materials, the roller sheet 12 may be formed using sheet webs having differing colors or textures. For example, in one embodiment, the first sheet web may be provided in a first color and the second sheet web may be provided in a second color, thereby allowing for the creation of a roller sheet 12 having alternating colored stripes along its height.

Referring now to FIG. 3, a simplified, schematic view of various components that may be utilized to manufacture the roller sheet 12 described above with reference to FIGS. 1 and 2 is illustrated in accordance with aspects of the present subject matter. In particular, FIG. 3 illustrates a simplified view of one embodiment of a mandrel 104 around which corresponding sheet webs 100, 102 may be wound in order to form the disclosed roller sheet 12.

As indicated above, the disclosed roller sheet 12 may be formed from two separate, continuous sheet webs, namely a first sheet web 100 and a second sheet web 102. Specifically, in several embodiments, the first and second sheet webs 100, 102 may be stacked one on top of the other and subsequently rolled or wound around a corresponding mandrel 104. As the first and second sheet webs 100, 102 are initially wrapped around the outer perimeter of the mandrel 104 for a first, full revolution, the sheet webs 100, 102 may be secured to one another (e.g., via application of a suitable adhesive(s)). Thereafter, as the first and second sheet webs 100, 102 continue to be wrapped around the outer perimeter of the mandrel 104 (e.g., for a second full revolution, a third full revolution, etc.) so that the sheet webs 100, 102 overlap themselves and create radially stacked layers of wrapped webs on the mandrel 104, the portions of the first and second sheet webs 100, 102 being newly wrapped around the mandrel 104 may be secured to one another as well as the previously wrapped portions of the sheet webs 100, 102 (e.g., via application of a suitable adhesive(s). As a result, an assembly of alternating layers of the first and second sheet webs 100, 102 may be formed around the mandrel 104, with each layer corresponding to one of the first sheet sections 16 or one of the second sheet sections 18 described above with reference to FIGS. 1 and 2. Once the sheets webs 100, 102 have been wrapped around the mandrel 104 a desired number of times (thereby creating a corresponding number of first and second sheet sections 16, 18), the assembly may be removed from the mandrel 105 and cut crosswise at a given location to create the roller sheet 12 shown in FIGS. 1 and 2.

It should be appreciated that, in the illustrated embodiment, the mandrel 104 is shown as having a circular shape. However, in other embodiments, the mandrel 104 may have any other suitable shape that allows the sheet webs 100, 102 to be wound or wrapped around the mandrel 104, such as a substantially square shape.

Additionally, as shown in FIG. 3, various other manufacturing components may also be provided to allow the first and second sheet webs 100, 102 to be processed prior to winding the webs 100, 102 around the mandrel 104. For example, one or more sheet folding mechanisms 106 (indicated by the dashed boxes) may be provided for creating a fold within each sheet web 100, 102. In addition, one or more adhesive applying mechanisms 108 may be provided for applying an glue bead to the first sheet web 100 and/or the second sheet web 102 to allow the webs 100, 102 to be attached to one another as they are wound around the mandrel 104.

It should also be appreciated that, as opposed to forming a single roller sheet 12 around the mandrel 104, multiple stock roller sheets may be formed around the mandrel 104 during a single winding process. For example, once the sheets webs 100, 102 have been wrapped around the mandrel 104 a desired number of times (thereby allowing for the creation of a roller sheet 12 having a corresponding number of first and second sheet sections 16, 18), the adhesive applying mechanism(s) 108 configured to apply the glue bead(s) used to secure the portions of the first and second sheet webs 100, 102 being newly wrapped around the mandrel 104 to the previously wrapped portion of the sheet webs 100, 102 may be temporarily turned off (e.g., for a full rotation of the mandrel 104). As a result, the subsequently wrapped portions of the first and second sheet webs 100, 102 may form a separate layered assembly wrapped on top of the previously wrapped assembly. This process may be repeated, as desired, to create any number of separate layered assemblies during the winding process. Thereafter, when the wrapped material is removed from the mandrel 104, the various layered assemblies formed around the mandrel 104 may be cut from one another so as to form separate roller sheets 12.

Referring now to FIG. 4, a cross-sectional view of a portion of the mandrel 104 and the sheet webs 100, 102 shown in FIG. 3 taken about line 4-4 is illustrated in accordance with aspects of the present subject matter. Specifically, FIG. 4 illustrates one embodiment of a suitable cross-sectional configuration for the sheet webs 100, 102. In addition, FIG. 4 illustrates an example of the relative positioning of the first and second sheet webs 100, 102 as such webs 100, 102 are being wrapped around the mandrel 104.

As shown in FIG. 4, each sheet web 100, 102 may generally correspond to an elongated strip of material defining any suitable cross-wise dimension 110. In several embodiments, each sheet web 100, 102 may include upper and lower faces extending between opposite ends of the web 100, 102. Specifically, as shown in FIG. 4, the first sheet web 100 may include an upper face 112 and a lower face 114 extending between a first end 116 of the web 100 (hereinafter referred as to the "first folded end 116") and a second end 118 of the web 100 (hereinafter referred to as the "first base end 118"). Similarly, the second sheet web 102 may include an upper face 120 and a lower face 122 extending between a first end 124 of the web 102 (hereinafter referred as to the "second folded end 124") and a second end 126 of the web 102 (hereinafter referred to as the "second base end 126").

In addition, each sheet web 100, 102 may include a fold edge positioned between its ends defining the location of a fold along the cross-wise direction of the sheet web 100, 102. For example, as shown in FIG. 4, the first sheet web 100 may include a first fold edge 128 between its ends 116, 118 that serves to divide the sheet web 100 into a first folded segment 130 and a first base segment 132, with the first folded segment 130 extending between the first folded end 116 and the first fold edge 128 at an angle relative to the cross-wise direction of the web 100 and the first base segment 132 extending between the first fold edge 128 and the first base end 118 generally along the cross-wise direction of the web 100. Similarly, the second sheet web 102 may include a second fold edge 134 between its ends 124, 126 that serves to divide the sheet web 102 into a second folded segment 136 and a second base segment 138, with the second folded segment 136 extending between the second folded end 124 and the second fold edge 134 at an angle relative to the cross-wise direction of the web 102 and the second base segment 138 extending between the second fold edge 134 and the second base end 126 generally along the cross-wise direction of the web 102.

In several embodiments, the sheet webs 100, 102 may be configured to be folded upward such that the upper face of each sheet web 100, 102 overlaps itself along the fold. For example, as shown in FIG. 4, the upward fold defined in the first sheet web 100 creates an overlapped configuration such that the portion of the upper face 112 extending along the first folded segment 130 faces towards the portion of its upper face 112 extending along the first base segment 132. Similarly, the upward fold defined in the second sheet web 102 creates an overlapped configuration such that the portion of its upper face 120 extending along the second folded segment 136 faces towards the portion of the upper face 120 extending along the second base segment 138. However, in other embodiments, one or both of the sheet webs 100, 102 may define a downwardly extending fold.

As indicated above, when winding the sheet webs 100, 102 around the mandrel 104, the webs 100, 102 may be configured to be stacked on one top of the other. For example, as shown in the illustrated embodiment, the second sheet web 102 is stacked on top of the first sheet web 100 such that the second sheet web 102 is positioned between the first sheet web 100 and the mandrel 104. However, in other embodiments, the second sheet web 102 may be placed on bottom such that the first sheet web 100 is positioned between the second sheet web 102 and the mandrel 104.

Additionally, in several embodiments, the sheet webs 100, 102 may be oriented relative to one another such that the folded segments 130, 136 of the first and second sheet webs 100, 102 face inwardly towards one another. For example, as shown in FIG. 4, the sheet webs 100, 102 may be staked having an opposite orientation so that the first fold edge 128 of the first sheet web 100 is generally vertically aligned with the second base end 126 of the second sheet web 102 and the second fold edge 134 of the second sheet web 102 is generally vertically aligned with the first base end of the first sheet web 100. In such an embodiment, the folded segment of each sheet web 100, 102 may be configured to be secured to the base segment of an adjacent portion of the other sheet web 100, 102. For instance, in the illustrated embodiment, the first folded segment 130 of the first sheet web 100 is configured to be attached to the second base segment 138 of the second sheet web 102 at a location generally adjacent to the second base end 126. In such an embodiment, as shown in FIG. 4, one or more glue beads 140 may be applied between the first folded segment 130 and the second base segment 138 to allow the sheet webs 100, 102 to be secured to one another. For instance, a glue bead(s) 140 may be applied (e.g., via the adhesive applying mechanism(s) 108) to the portion of the bottom face 114 of the first sheet web 100 extending along the first folded segment 130 and/or to a portion of the bottom face 122 of the second sheet web 102 at a location adjacent to the second base end 126. Regardless, by applying adhesive between the first and second sheet webs 100, 102 in the manner shown in FIG. 4, the sheet webs 100, 102 may be secured to one another as the webs 100, 102 are wound around the mandrel 104. For example, FIG. 4 also illustrates portions of the first and second webs 100, 102 that were previously wound around the mandrel 104 (e.g., during the previous revolution of the mandrel 104). As shown, due to the application of the adhesive, the first and second sheet webs 100, 102 may be secured to one another along an attachment area 142 defined between the first folded segment 130 and the second base segment 138.

Moreover, as the sheet webs 100, 102 are wound around the mandrel 104, one or more glue beads 144 may also be applied (e.g., via the adhesive application mechanism(s) 108) to the top of the folded segment of the sheet web located closest to the mandrel 104 to allow the sheet web to be secured to an adjacent portion of the other sheet web that had been previously wound around the mandrel 104. For example, as shown in FIG. 4, a glue bead(s) 144 may be applied to the top of the second folded segment 136 (i.e., along the portion of the bottom face 122 extending along the second folded segment 136). As such, when the portions of the sheet webs 100, 102 shown at the bottom of FIG. 4 are wound around the mandrel 104, the top of the second folded segment 136 may be secured to the first base segment 132 of the previously wound portion of the first sheet web 100 across an attachment area 146 located generally adjacent to the first base end 118 of the first sheet web 100.

By configuring the sheet webs 100, 102 in the manner shown in FIG. 4, the first and second sheet webs 100, 102 may be coupled to one another and to other adjacent pre-wound sheet layers as the sheet webs 100, 102 are continuously wound around the mandrel 104. Thus, a layered assembly of alternating sections of the first and second sheet webs 100, 102 may be built-up around the mandrel 104. As indicated above, once the desired number of layers is achieved, the layered assembly may be cut cross-wise at a given location through each of the layers, thereby forming the roller sheet 12 (e.g., as a stack having a width generally corresponding to the circumference of the mandrel 104). The roller sheet 12 may then be cut or trimmed, if necessary, and subsequently wound around a suitable roller 14.

Moreover, as indicated above, the disclosed manufacturing process may be utilized to form multiple, separate roller sheets 12 on the mandrel 104 during a given winding process. In such instance, the glue beads 144 shown in FIG. 4 as being applied to the top of the folded segment of the sheet web located closest to the mandrel 104 may be temporarily removed (e.g., by not applying the glue bead(s) for a full rotation of the mandrel 104). As a result, the newly wound portion of the sheet web located closest to the mandrel 104 will not be secured to the adjacent portion of the other sheet web that had been previously wound around the mandrel 104, thereby allowing for the start of a new roller sheet 12 to be formed around the mandrel 104.

Referring now to FIG. 5, an alternative configuration for positioning the first and second sheet webs 100, 102 relative to one another when forming the disclosed roller sheet 12 is illustrated in accordance with aspects of the present subject matter. As shown, instead of attaching the first folded segment 130 to the second base segment 138 along the portions of bottom faces 114, 122 of the first and second sheet webs 100, 102, a portion of the second base segment 138 adjacent to the second base end 126 may be configured to be positioned between the first folded segment 130 and the first base segment 132. In such an embodiment, one or more glue beads 140 may be applied (e.g., via the adhesive application mechanism(s) 108) to the portion of the upper face 112 of the first sheet web 100 extending along the first folded segment 130 and/or to a portion of the upper face 120 of the second sheet web 102 at a location adjacent to the second base end 126 to allow the first and second sheet webs 100, 102 to be secured to one another. For example, as indicated at the top of FIG. 5 by the pre-wound sheet layers, such application of the adhesive may allow the first and second sheet webs 100, 102 to be secured to one another along an attachment area 142 defined between the first folded segment 130 and the second base segment 138.

Additionally, similar to embodiment described above with reference to FIG. 4, one or more glue beads 144 may also be applied (e.g., via the adhesive application mechanism(s) 108) to the top of the folded segment of the sheet web located closest to the mandrel 104 to allow the sheet web to be secured to an adjacent portion of the other sheet web that had been previously wound around the mandrel 104. For example, as shown in FIG. 5, glue bead(s) 144 may be applied to the top of the second folded segment 136 (i.e., along the portion of the bottom face 122 extending along the second folded segment 136). As such, when the portions of the sheet webs 100, 102 shown at the bottom of FIG. 5 are wound around the mandrel 104, the top of the second folded segment 136 may be secured to the first base segment 132 of the previously wound portion of the first sheet web 100 across an attachment area 146 located generally adjacent to the first base end 118 of the first sheet web 100.

Referring now to FIG. 6, yet another embodiment of an alternative configuration for positioning the first and second sheet webs 100, 102 relative to one another when forming the disclosed roller sheet 12 is illustrated in accordance with aspects of the present subject matter. As shown, the first and second sheet webs 100, 102 have been formed with downwardly extending folds. In such an embodiment, the attachment locations for applying the corresponding glue beads 140, 144 may be adjusted to accommodate the downwardly extending folds. For example, as shown in FIG. 6, one or more glue beads 140 may be applied between the second folded segment 136 and the first base segment 118 to allow the second folded segment 136 to the attached to the first base segment 118 at a location generally adjacent to the first base end 118 of the first sheet web 100. Additionally, as shown in FIG. 6, one or more glue beads 144 may be applied to the portion of the upper face 120 of the second sheet web 102 extending along the second base segment 138 at a location adjacent to the second base end 126 to allow the second sheet web 102 to be secured to the first folded segment 130 of the portion of the first sheet web 100 that had been previously wound around the mandrel 104.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A roller sheet for use as a covering for an architectural opening, said roller sheet comprising:
   a plurality of first sheet sections; and
   a plurality of second sheet sections, said plurality of second sheet sections being arranged relative to said plurality of first sheet sections in an alternating configuration such that said roller sheet forms a continuous sheet of material alternating between adjacent pairs of said plurality of first and second sheet sections along a length of said roller sheet, said continuous sheet defining a width in a widthwise direction of said roller sheet between opposed sides of said continuous sheet;
wherein:
one of said first sheet section or said second sheet section of each adjacent pair of said plurality of first and second sheet sections includes a formed fold adjacent to an interface defined between each said adjacent pair of said plurality of first and second sheet sections, said formed fold comprising one of a plurality of formed folds of said roller sheet;
said formed fold extends in the widthwise direction along the width of said roller sheet; and
said plurality of formed folds alternate between said opposed sides of said continuous sheet along the length of said roller sheet such that said formed folds facilitate collapsing said continuous sheet into a stacked configuration.

2. The roller sheet as in claim 1, wherein said plurality of first and second sheet sections fold in alternating directions about said plurality of formed folds when said roller sheet is collapsed into said stacked configuration.

3. The roller sheet as in claim 1, wherein said plurality of formed folds alternate between being defined by said first sheet section of each said adjacent pair of said plurality of first and second sheet sections and said second sheet section of each said adjacent pair of said plurality of first and second sheet sections at each successive interface along the length of said roller sheet.

4. The roller sheet as in claim 1, wherein each of said plurality of formed folds is defined by said one of said first sheet section or said second sheet section directly above or directly below each said interface.

5. The roller sheet of claim 1, wherein, at each said interface, an overlapped portion of said roller sheet is defined at which each said adjacent pair of said plurality of first and second sheet sections overlap each other.

6. The roller sheet as in claim 1, wherein said first sheet section is formed from one of a woven material, a non-woven material, a knitted material, a film material, or a laminated material and second sheet section is formed from a different one of a woven material, a non-woven material, a knitted material, a film material or a laminated material.

7. The roller sheet as in claim 1, wherein said plurality of first and second sheet sections have differing light transmittance values.

8. The roller sheet as in claim 1, wherein said plurality of first and second sheet sections are different colors.

9. The roller sheet as in claim 1, wherein said plurality of first and second sheet sections are both formed from one of a woven material, a non-woven material, a knitted material; a film material, or a laminated material.

10. The roller sheet as in claim 1, wherein, at each said interface, an overlapped portion of said roller sheet is defined at which each said adjacent pair of said first and second sheet sections overlap each other.

11. The roller sheet as in claim 1, wherein:
each of said plurality of first sheet sections is formed by a first sheet web; and
each of said plurality of second sheet sections is formed by a second sheet web.

12. The roller sheet as in claim 11, wherein said first sheet web is formed from one of a woven material, a nonwoven material, a knitted material, a film material, or a laminated material and second sheet web is formed from a different one of a woven material, a non-woven material, a knitted material, a film material or a laminated material.

13. The roller sheet as in claim 11, wherein said first and second sheet webs have differing light transmittance values.

14. The roller sheet as in claim 11, wherein said first and second sheet webs are different colors.

15. The roller sheet as in claim 11, wherein said first and second sheet webs are both formed from one of a woven material, a non-woven material, a knitted material, a film material, or a laminated material.

16. The roller sheet as in claim 11, wherein each said first sheet section is coupled to said adjacent second sheet section at an interface location such that said first folded segment of said first sheet section is coupled to second base segment of said adjacent second sheet section at said interface.

17. A roller sheet for use as a covering for an architectural opening, said roller sheet comprising:
a plurality of first sheet sections, each first sheet section of said plurality of first sheet sections including a first fold between opposed first and second ends of each said first sheet section defining a first folded segment extending between said first fold and said first end of each said first sheet section and a first base segment extending between said first fold and said second end of each said first sheet section; and
a plurality of second sheet sections, each second sheet section of said plurality of second sheet sections including a second fold between opposed first and second ends of each said second sheet section defining a second folded segment extending between said second fold and said first end of each said second sheet section and a second base segment extending between said second fold and said second end of each said second sheet section;
wherein:
said plurality of second sheet sections are arranged relative to said plurality of first sheet sections in an alternating configuration such that said roller sheet forms a continuous sheet of material alternating between adjacent pairs of said first and second sheet sections along a length of said roller sheet; and
said first folded segment of each said first sheet section is coupled to said second base segment of an adjacent second sheet section.

18. The roller sheet as in claim 17, wherein a direction of said first and second folds alternates between opposed sides of said continuous sheet along the length of said roller sheet such that said first and second folds facilitate collapsing said continuous sheet into a stacked configuration.

19. The roller sheet as in claim 17, wherein said plurality of second sheet sections are arranged relative to said plurality of first sheet sections in the alternating configuration such that said first and second folds allow said roller sheet to be collapsed into a stacked configuration.

20. The roller sheet as in claim 19, wherein said plurality of first and second sheet sections fold in alternating directions about said first and second folds when said roller sheet is collapsed into said stacked configuration.

21. A roller sheet for use as a covering for an architectural opening, said roller sheet comprising:
a plurality of first sheet sections; and
a plurality of second sheet sections, said plurality of second sheet sections being arranged relative to said plurality of first sheet sections in an alternating configuration such that said roller sheet forms a continuous sheet of material alternating between adjacent pairs of said plurality of first and second sheet sections along a length of said roller sheet, said continuous sheet defining a width in a widthwise direction of said roller sheet between opposed sides of said continuous sheet;

wherein:

one of said first sheet section or said second sheet section of each adjacent pair of said plurality of first and second sheet sections includes a formed fold adjacent to an interface defined between each said adjacent pair of said plurality of first and second sheet sections, said formed fold comprising one of a plurality of formed folds of said roller sheet;

said formed fold extends in the widthwise direction along the width of said roller sheet;

said plurality of formed folds alternate between being defined by said first sheet section of each said adjacent pair of said plurality of first and second sheet sections and said second sheet section of each said adjacent pair of said plurality of first and second sheet sections at each successive interface along the length of said roller sheet; and said formed fold defined adjacent to each said interface facilitates collapsing said roller sheet into a stacked configuration.

* * * * *